(12) United States Patent
Jiang et al.

(10) Patent No.: US 10,069,441 B2
(45) Date of Patent: Sep. 4, 2018

(54) ELECTRIC ENERGY SCAVENGER DEVICE

(71) Applicant: Analog Devices, Inc., Norwood, MA (US)

(72) Inventors: Yingqi Jiang, Woburn, MA (US); Qian Zhang, Wilmington, MA (US); Kuang L. Yang, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 277 days.

(21) Appl. No.: 14/918,838

(22) Filed: Oct. 21, 2015

(65) Prior Publication Data

US 2017/0117824 A1  Apr. 27, 2017

(51) Int. Cl.
*H01L 41/113* (2006.01)
*H02N 2/18* (2006.01)

(52) U.S. Cl.
CPC .................... *H02N 2/183* (2013.01)

(58) Field of Classification Search
CPC .................... H02N 2/18; F03G 7/065
USPC .................................................. 310/339
See application file for complete search history.

(56) References Cited

U.S. PATENT DOCUMENTS

| | | | |
|---|---|---|---|
| 4,492,875 A | 1/1985 | Rowe | 290/53 |
| 5,512,795 A * | 4/1996 | Epstein | H02N 2/18 310/339 |
| 5,814,921 A * | 9/1998 | Carroll | F03B 13/16 290/53 |
| 5,934,882 A | 8/1999 | Olney et al. | 417/233 |
| 6,909,224 B2 | 6/2005 | Ghandi et al. | 310/339 |
| 8,729,747 B2 | 5/2014 | Arnold et al. | 310/34 |

(Continued)

FOREIGN PATENT DOCUMENTS

| | | | | |
|---|---|---|---|---|
| CN | 103490667 | 1/2014 | | H02N 2/18 |
| CN | 103780127 | 5/2014 | | H02N 1/04 |

(Continued)

OTHER PUBLICATIONS

Fan et al., "Transparent Triboelectric Nanogenerators and Self-Powered Pressure Sensors Based on Micropatterned Plastic Films," American Chemical Society—Nano Letters, vol. 12, No. 6, 6 pages, 2012.

(Continued)

*Primary Examiner* — Thomas Dougherty
(74) *Attorney, Agent, or Firm* — Wolf, Greenfield & Sacks, P.C.

(57) ABSTRACT

An electric energy scavenger device has a housing forming an internal chamber with an internal wall, and a movable element contained within the internal chamber. The movable element is freely movable and unconnected to any other movable element within the internal chamber. Within the internal chamber, the device also has a plurality of piezoelectric charge conversion elements positioned along the internal wall. The plurality of piezoelectric charge conversion elements are positioned side-by-side to contact the movable element when the movable element moves within the internal chamber. In addition, the movable element is configured to simultaneously contact at least two of the plurality of side-by-side piezoelectric charge conversion elements. During use, the movable element is freely movable within the internal chamber in response to movement of the entire housing.

20 Claims, 12 Drawing Sheets

(56) References Cited

U.S. PATENT DOCUMENTS

| | | | | |
|---|---|---|---|---|
| 2010/0052324 | A1* | 3/2010 | Priya | C04B 35/493 |
| | | | | 290/50 |
| 2013/0069487 | A1* | 3/2013 | Houser | H02N 2/18 |
| | | | | 310/339 |
| 2016/0236043 | A1* | 8/2016 | Savelli | A63B 39/00 |

FOREIGN PATENT DOCUMENTS

| | | | | |
|---|---|---|---|---|
| CN | 104426425 | | 3/2015 | ............... H02N 2/18 |
| JP | 529388 A | * | 1/1977 | ............. H01L 41/00 |
| JP | H10-42540 | | 2/1998 | ................ G06F 1/26 |
| JP | 2002262584 A | * | 9/2002 | ............. H02N 2/00 |
| JP | 2009-240011 | | 10/2009 | ............. B63B 22/00 |
| RU | 2 430 448 | | 9/2011 | ........... H01K 41/113 |
| WO | WO 02/103881 | | 12/2002 | ............... H02K 1/00 |

OTHER PUBLICATIONS

Fan et al., "Supporting Information—Transparent Triboelectric Nanogenerators and Self-Powered Pressure Sensors Based on Micro-patterned Plastic Films," American Chemical Society—Nano Letters, 9 pages, 2012.

International Searching Authority, International Search Report—International Application No. PCT/US2016/053751, dated Jan. 12, 2017, together with the Written Opinion of the International Searching Authority, 12 pages.

International Preliminary Report on Patentability dated May 3, 2018 in connection with International Application No. PCT/US2016/053751.

PCT/US2016/053751, May 3, 2018, International Preliminary Report on Patentability.

* cited by examiner

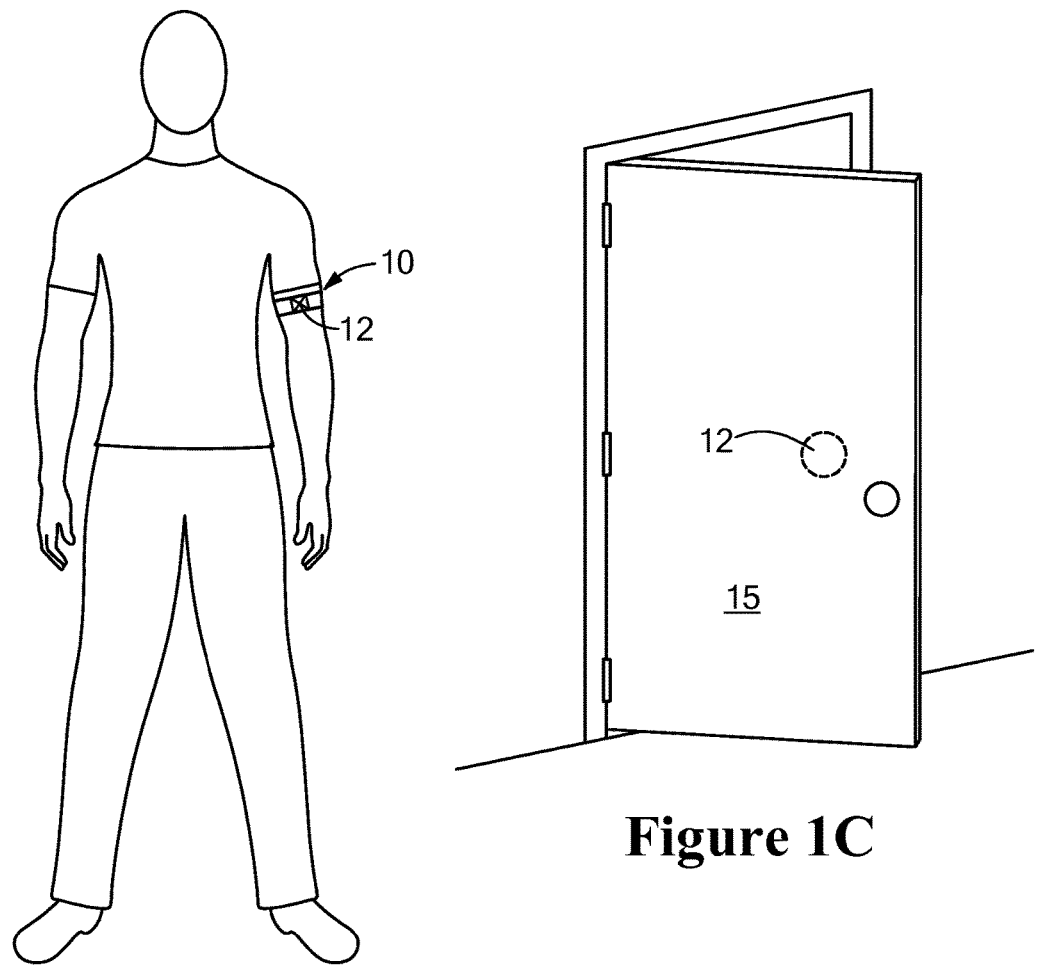
Figure 1C
Figure 1A
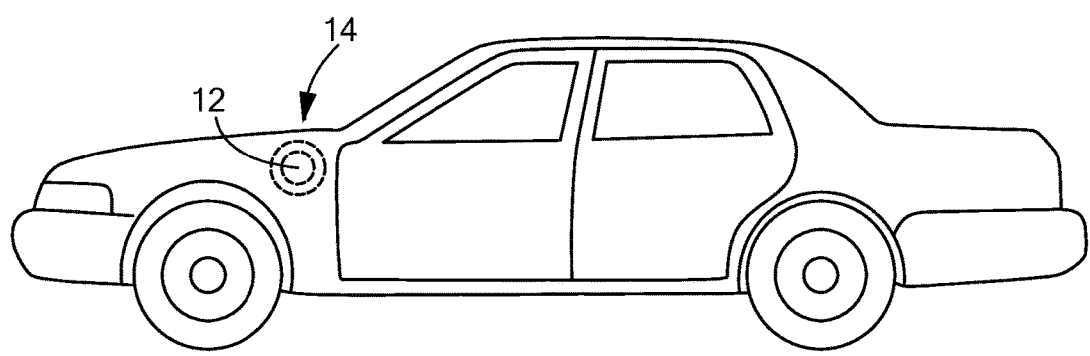
Figure 1B

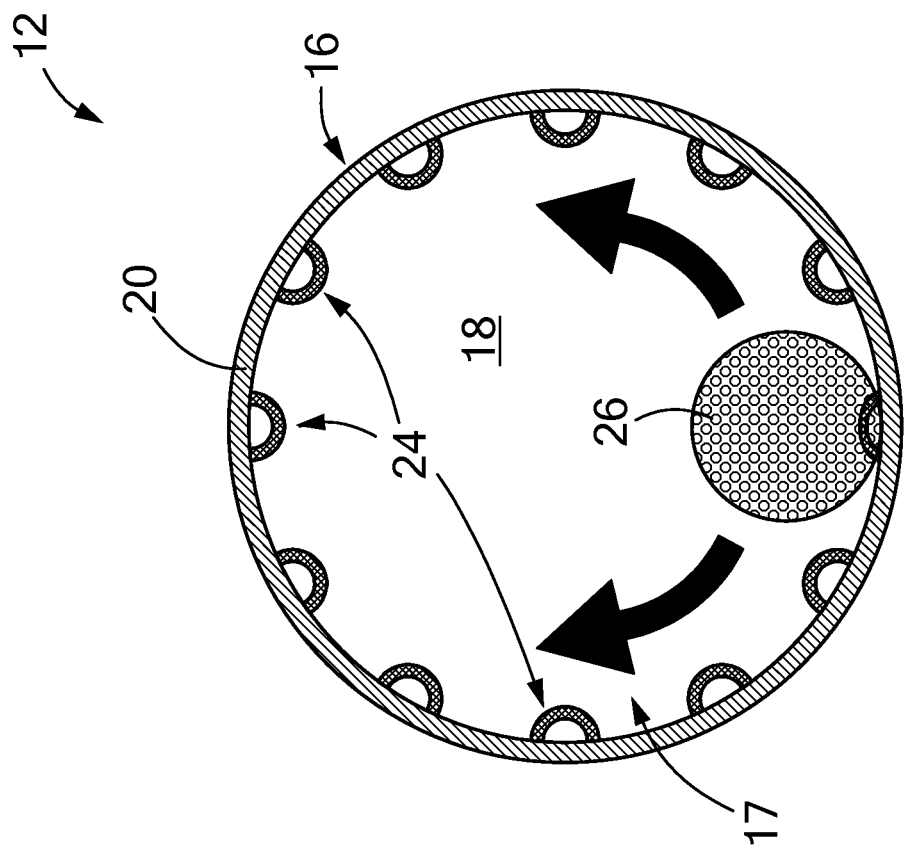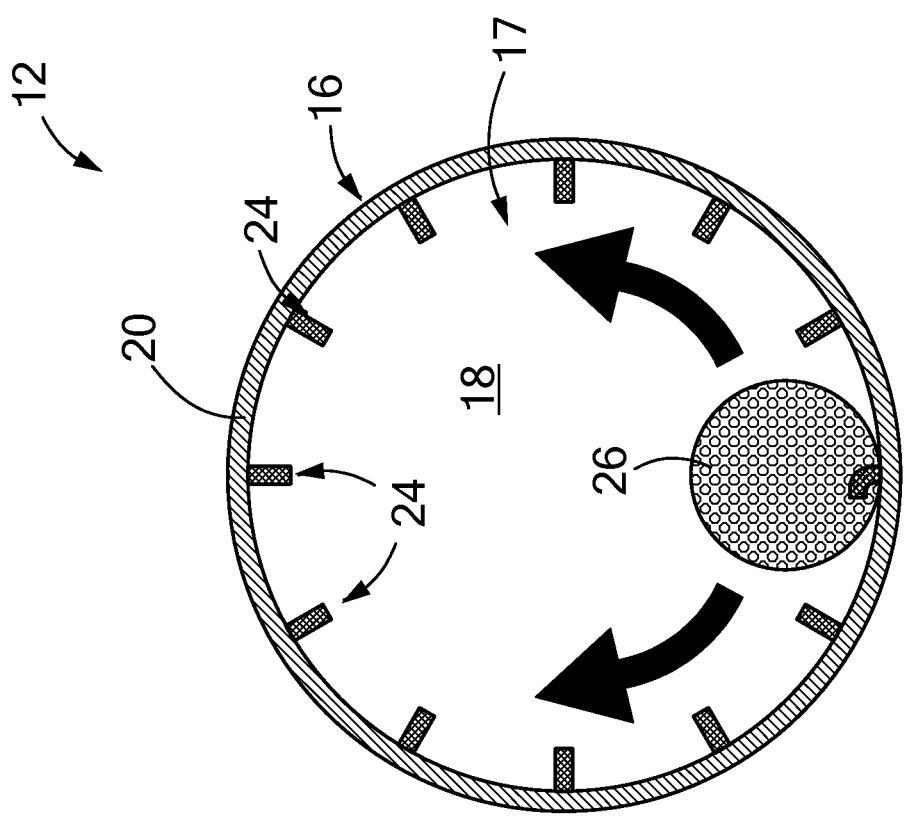

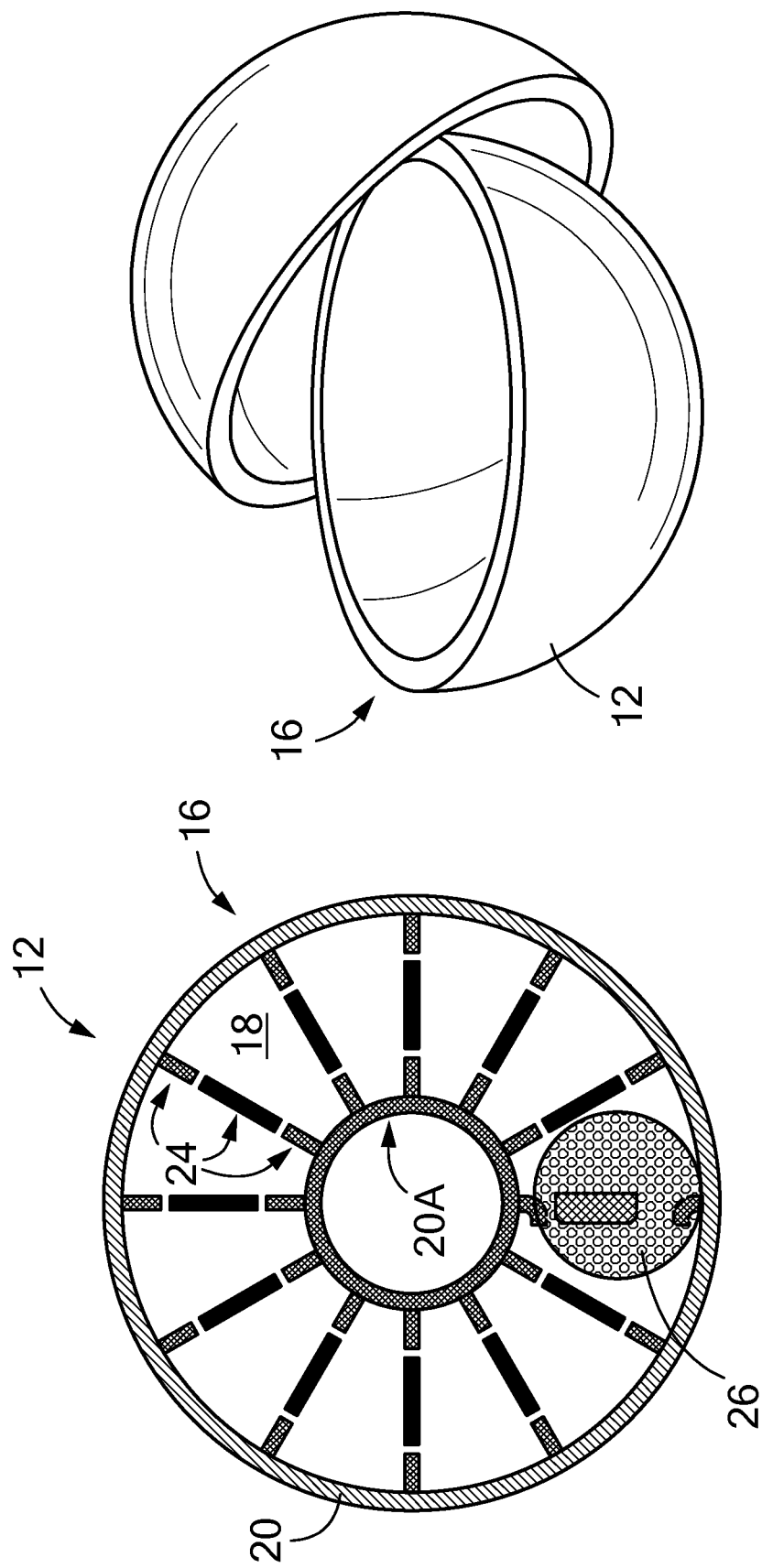

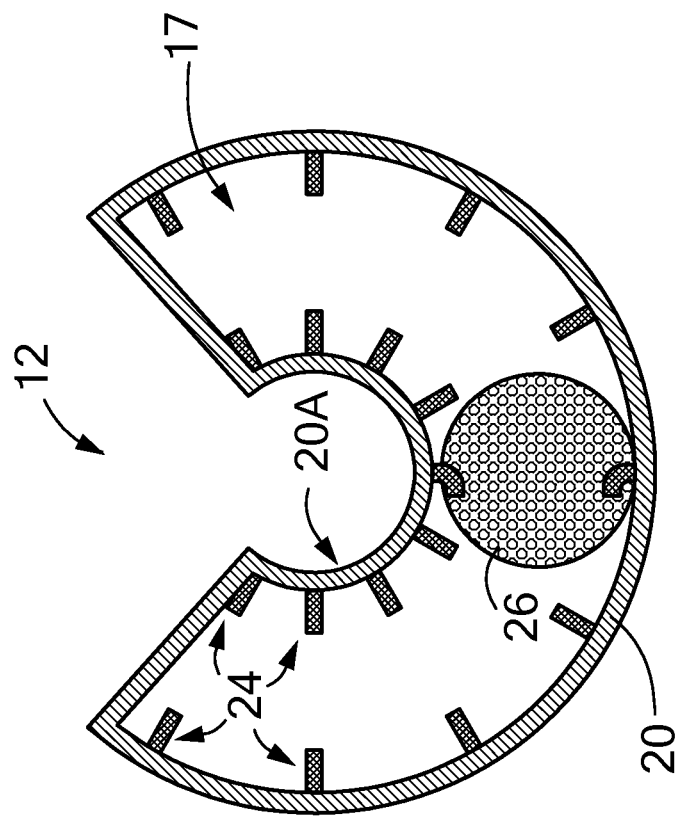
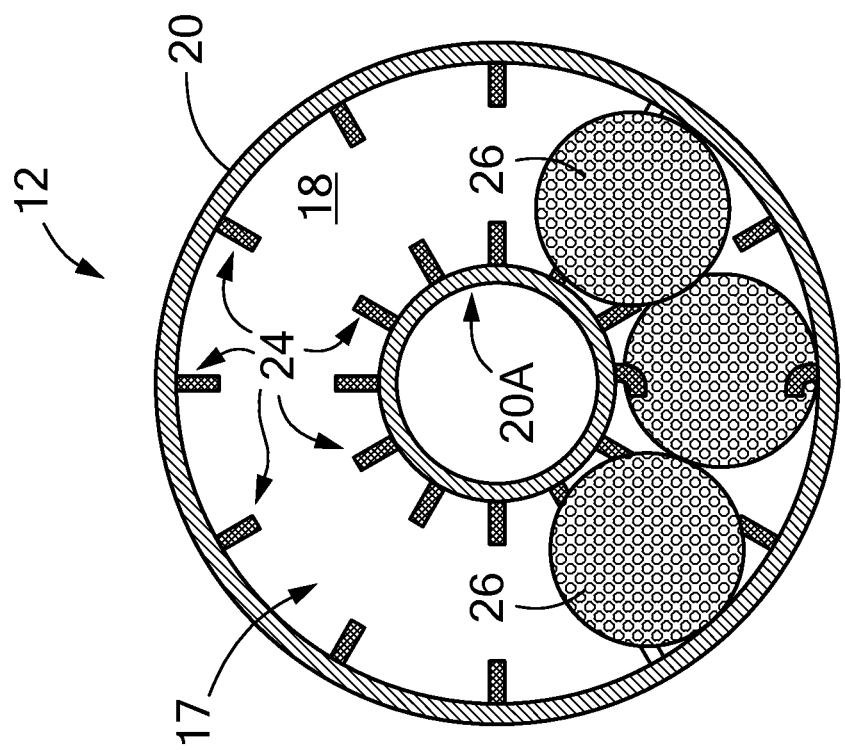
Figure 5
Figure 4

Triboelectric Series[1]

| Positive ↑ | Aniline-formol resin<br>Polyformaldehyde 1.3-1.4<br>Etylcellulose<br>Polyamide 11<br>Polyamide 6-6<br>Melanime formol<br>Wool, knitted<br>Silk, woven<br>Polyethylene glycol succinate<br>Cellulose<br>Cellulose acetate<br>Polyethylene glycol adipate<br>Polydiallyl phthalate<br>Cellulose (regenerated) sponge<br>Cotton, woven<br>Polyurethane elastomer<br>Styrene-acrylonitrile copolymer<br>Styrene-butadiene copolymer<br>Wood<br>Hard rubber<br>Acetate, Rayon<br>Polymethyl methacrylate (Lucite)<br>Polyvinyl alcohol<br>(continued) ➚ | Polyvinyl alcohol<br>Polyester (Dacron) (PET)<br>Polyisobutylene<br>Polyuretane flexible sponge<br>Polyethylene terephthalate<br>Polyvinyl butyral<br>Formo-phenolique, hardened<br>Polychlorobutadiene<br>Butadiene-acrylonitrile copolymer<br>Natural rubber<br>Polyacrilonitrile<br>Acrylonitrile-vinyl chloride<br>Polybisphenol carbonate<br>Polychloroether<br>Polyvinylidine chloride (Saran)<br>Poly(2,6-dimethyl polyphenyleneoxide)<br>Polystyrene<br>Polyethylene<br>Polypropylene<br>Polydiphenyl propane carbonate<br>Polyimide (Kapton)<br>Polyethylene terephtalate<br>Polyvinyl chloride (PVC)<br>Polytrifluorochloroethylene<br>Polydimethylsiloxane (PDMS)<br>Polytetrafluoroethylene (Teflon) | ↓ Negative |

Figure 7B

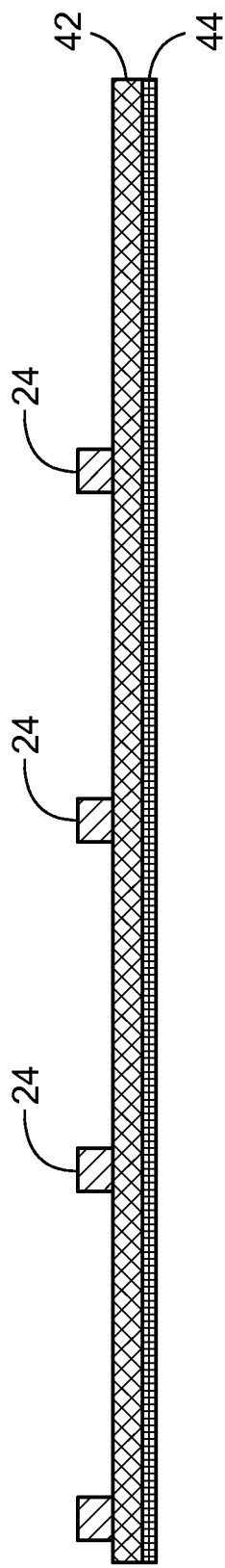

ELECTRIC ENERGY SCAVENGER DEVICE

FIELD OF THE INVENTION

The disclosure generally relates to energy generation devices and, more particularly, the disclosure relates to energy scavenger devices.

BACKGROUND OF THE INVENTION

Wearable and other small, portable devices commonly use battery power. More recently, energy scavenger devices (also known as "energy harvesters"), which generate energy from the environment, have become more widely used to power small devices. Kinetic energy scavenger devices have become particularly popular due to their broad applicability to various energy sources, such automobiles, buildings, and human bodies.

Many kinetic energy scavenger devices, however, rely on high frequency and predictable motion. For example, automobile tires often have energy scavenger devices to capture the kinetic motion of the moving automobile wheels. This energy powers MEMS pressure sensors that transmit tire pressure readings to the central computer of the automobile. As such, energy scavenger devices in tires typically capture the energy at relatively high frequencies and with generally known directions/motion.

The random, low frequency motion of a person (e.g., a person jogging) or object, however, presents certain challenges that such noted energy scavenger devices have difficulty addressing.

SUMMARY OF VARIOUS EMBODIMENTS

In accordance with one embodiment of the invention, an electric energy scavenger device has a housing forming an internal chamber with an internal wall, and a movable element contained within the internal chamber. The movable element is freely movable and unconnected to any other movable element within the internal chamber. Within the internal chamber, the device also has a plurality of piezoelectric charge conversion elements positioned along the internal wall. The plurality of piezoelectric charge conversion elements are positioned side-by-side to contact the movable element when the movable element moves within the internal chamber. In addition, the movable element is configured to simultaneously contact at least two of the plurality of side-by-side piezoelectric charge conversion elements. During use, the movable element is freely movable within the internal chamber in response to movement of the entire housing.

Among other configurations, the housing may form a toroid. As a consequence, the internal chamber is in the shape of a toroid. Moreover, the internal wall may include a first internal wall and a second internal wall that is parallel with the first internal wall. The plurality of piezoelectric charge conversion elements may include first side-by-side charge conversion elements and second side-by-side charge conversion elements. The first internal wall has the first of side-by-side charge conversion elements, while the second internal wall has the second side-by-side piezoelectric charge conversion elements. The movable element is configured to simultaneously contact at least one of the first side-by-side charge conversion elements and at least one of the second side-by-side charge conversion elements.

In a similar manner, the internal wall may include a first internal wall, a second internal wall, and a third internal wall. The first and third walls are substantially parallel, while the second internal wall is substantially normal to the first internal wall. The plurality of charge conversion element may include a first charge conversion element on the first internal wall, a second charge conversion element on the second internal wall, and a third charge conversion element on the third internal wall.

The movable element may have specified surface features, and the internal chamber may have complimentarily shaped surface guide features to guide the movable element in one dimension along the internal chamber. Such features can alleviate the direct pressure that the movable element applies to the charge conversion element and, therefore, improve the device durability. The movable element preferably is configured to traverse along and rotate within the internal chamber in response to movement of the housing.

Among other things, the internal chamber may be configured so that the movable element is constrained to movement in no more than one dimension, relative to the internal chamber, in response to movement of the entire housing. Alternatively, the internal chamber may be configured so that the movable element can move in two or three dimensions, relative to the internal chamber, in response to movement of the entire housing.

In accordance with another embodiment of the invention, an electric energy scavenger device has a housing forming an internal chamber with an internal wall, a stationary element fixed on the internal wall within the internal chamber and including a first material, and a movable element within the internal chamber. The movable element includes a second material and is freely movable within the internal chamber so that it slides along the stationary element in response to housing movement. The first material and second materials have different properties for gaining and losing electrons so that they exhibit a non-negligible triboelectric phenomenon when the first material slides along the second material. The device also has a pair of electrodes (or multiple pairs of electrodes) in contact with the stationary element. The charge in the pair of electrodes changes as the moveable element slides over the stationary element.

In accordance with other embodiments, an electric energy scavenger device has a housing forming an internal chamber having an internal wall, and a plurality of triboelectric charge conversion elements within the internal chamber and positioned along the internal wall. The plurality of triboelectric charge conversion element includes a first material. The device also has a movable element contained within the internal chamber. The movable element is freely movable within the internal chamber and includes a second material. The first and second materials have different properties for gaining and losing electrons so that they exhibit a non-negligible triboelectric phenomenon when the first material contacts and separates from the second material. The plurality of triboelectric charge conversion elements are positioned side-by-side to contact the movable element when the movable element moves within the internal chamber. Moreover, the movable element is freely movable within the internal chamber in response to movement of the housing (e.g., the entire housing).

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 1A schematically shows a person using a wearable device that scavenges human motion energy in accordance with illustrative embodiments of the invention.

FIG. 1B schematically shows an object, such as automobile, having a device that scavenges vehicle motion energy in accordance with illustrative embodiments of the invention.

FIG. 1C schematically shows a door having a device that scavenges door opening and closing motion energy in accordance with illustrative embodiments of the invention.

FIGS. 3A-3C schematically show partial cross-sectional views of the energy scavenger device of FIG. 2 in accordance with various embodiments of the invention.

FIG. 3D schematically show a three-dimensional housing.

FIG. 4 schematically shows a partial cross-sectional view of an embodiment of the energy scavenger device of FIG. 2 using a plurality of movable elements.

FIG. 5 schematically shows a partial cross-sectional view of an embodiment of the energy scavenger device of FIG. 2 with a partial toroidal internal chamber for reduced device volume.

FIG. 7B shows a triboelectric series that may be used in accordance with illustrative embodiments of the invention.

FIG. 10 schematically shows the energy scavenger device at step 900 of the process of FIG. 9.

DESCRIPTION OF ILLUSTRATIVE EMBODIMENTS

Figure 2:
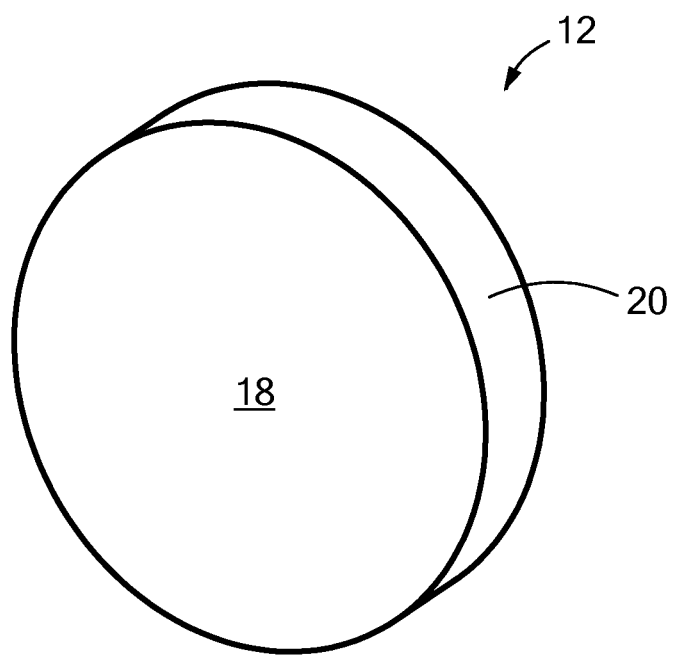
FIG. 2 schematically shows a perspective view of an energy scavenger device configured in accordance with illustrative embodiments of the invention.

In illustrative embodiments, an energy generating/capture device attached to a person or object efficiently scavenges kinetic energy generated by low frequency motion directed in random directions. To that end, the energy generating device has a movable element that freely moves within an internal chamber when the device itself moves (e.g., due to gravity or inertia). Specifically, the internal chamber has a plurality of elements that, when contacted by the movable element, generate energy. Details of illustrative embodiments are discussed below.

FIG. 1A schematically shows a person using a wearable device 10 having an electric energy scavenger device 12 that generates energy in accordance with illustrative embodiments of the invention. The wearable device 10 may include any of a wide variety of commonly used wearable devices, such as one or more of a watch, radio, global positioning system, an MP3 player, a health monitor (e.g., a heart rate monitor), and a virtual-reality device. Such a device 10 may secure to the human body and any of a wide variety of manners, and at a wide variety of locations. F or example, the device 10 may connect to the person's arm using a Velcro secured strap.

People tend to move in random manners at low frequencies (e.g., a few Hertz). For example, a person may walk, run, play a sport, ride in an automobile, ride a bicycle, etc. To augment or power its underlying functionality, the wearable device 10 has its built-in energy scavenger device 12 that converts this random, low frequency kinetic energy into electrical energy that at least in part may power the wearable device 10. Among other things, the energy scavenger device 12 may store this converted energy in a local battery, and/or immediately use this energy to at least in part power the underlying electronic technology.

Moreover, although not shown, the person may wear more than one wearable device 10, with integrated energy scavenging capabilities, to more efficiently capture the once lost kinetic energy. For example, the person may wear one or more energy portable devices 10 with integrated scavenger devices 12 (with or without the underlying wearable device 10) on each of their different limbs, on their torso, hands, feet, etc. The converted energy may be wirelessly transferred to the application device, or transferred via a wire.

The energy scavenger devices 12 need not be integral or a part of another device, such as an MP3 player. Instead, the energy scavenger device 12 may take on the form of a wearable device itself with no substantial function other than capturing the person's kinetic energy. For example, the energy scavenger device 12 may be mounted on the person's arm, as shown in FIG. 1A, and connect with a rechargeable battery that also is carried on the person's body.

Of course, discussion of people using energy scavenger devices 12 is illustrative and not intended to limit a number of other embodiments—illustrative embodiments also apply to movable inanimate objects. FIG. 1B, for example, schematically shows an automobile 14 having an energy scavenger device 12 that operates in a similar manner to that described above with regard to the device 12 worn by the person. In this example, the energy scavenger device 12 couples to the interior of the automobile 14. In a manner similar to the person of FIG. 1A, the automobile 14 can have a plurality of energy scavenger devices 12 coupled to various different movable locations of the automobile 14. For example, the energy scavenger device 12 may be within the tires for energizing MEMS pressure sensors. During normal operation, the MEMS pressure sensors communicate with internal computer of the automobile 14, providing a warning of low tire pressure. The rotation of the tires, which has a higher frequency than that of the person, thus moves the energy scavenger device 12 to provide sufficient power for the MEMS pressure sensor. As yet another example, FIG. 1C schematically shows a door 15 having the energy scavenger device 12 that scavenges the motion energy as the door swings.

Discussion of the automobile 14 and door 15 is illustrative only, however, and not intended to limit various embodiments of the invention. Indeed, those skilled in the art can couple energy scavenger devices 12 to any of a wide variety of other movable objects, such as roller coasters, bicycles, mobile computing devices, and exercise machines.

The energy scavenger device 12 can have any of a wide variety of form factors. FIG. 2 schematically shows one form factor, in which the energy scavenger device 12 is in the form of a cylinder. Specifically, the energy scavenger device 12 of FIG. 2 has a housing 16 that, as discussed below, forms an internal chamber (FIG. 3A and others) containing the mechanisms for scavenging kinetic energy. The internal chamber may form a fully closed chamber, or a partially closed chamber. In either case, the internal chamber preferably is formed to keep all of its elements (e.g., a movable element 26, discussed below) within the internal chamber.

As shown, the housing 16 has a pair of spaced apart sidewalls 18 that are substantially parallel to each other, and a cylindrical wall 20 that is generally normal to the two sidewalls 18. Accordingly, the cylindrical wall 20 forms right angles with the two sidewalls 18. Other embodiments, however, may form the housing 16 to have one substantially continuous wall, eliminating seams and angles.

Discussion of a cylindrical form factor is but one example. Those skilled in the art can select any of a wide variety of other form factors, such as a rectangular form factor, a wider form factor, a random form factor (e.g., customized to the space in which it is to be mounted), etc.

Illustrative embodiments implement the energy scavenger device 12 using one or both of piezoelectric elements and triboelectric elements. Both types of energy scavenger devices 12 are discussed in detail below. To that end, FIGS. 3A-3D schematically show partial cross-sectional views of exemplary implementations of the energy scavenger device 12 of FIG. 2 using piezoelectric technology. Specifically, FIG. 3A schematically shows a (simplified) cross-sectional view of the energy scavenger device 12, in which the housing 16 forms the noted internal chamber 17 having at least one internal wall (discussed below). The internal wall has a plurality of piezoelectric charge conversion elements 24 extending radially inwardly. Each of those charge conversion elements 24 are in the form of flexible, side-by-side pillars and, preferably are spaced very close to other charge conversion elements 24. The internal wall thus may have closely spaced successive rows of charge conversion elements 24 for optimizing conversion efficiency.

The charge conversion elements 24 may include any of a wide variety of well-known piezoelectric materials. For example, each charge conversion element 24 may be formed from a stack of three layers of material. The top layer and bottom layer may be formed from piezoelectric material, while the middle layer may be formed from an insulator. When the charge conversion element 24 deforms from its flat configuration, one of the outside layers stretches to some extent while the other of the outside layers compresses to some extent. This causes a potential difference, generating energy that can be captured.

Indeed, the charge conversion elements 24 can be in any of a number of forms. FIG. 3B, for example, shows other form in which the charge conversion elements 24 are in the forms of arcs. Those skilled in the art can use any of a number of form factors for the charge conversion elements 24 and thus, discussion of specific form factors (e.g., the material stack) is illustrative and not intended to limit various embodiments.

The internal chamber 17 also contains a movable element 26, such as a rolling element (e.g., a ball or rolling cylinder), that moves freely within the internal chamber 17. In illustrative embodiments, the movable element 26 is unconnected to any other element within the internal chamber 17 and has a mass that is sufficiently high enough to respond to movement of the entire housing 16. Among other things, the movable element 26 may be formed from metal or plastic.

During use, the person or object may move the entire energy scavenger device 12. For example, a person jogging may move the energy scavenger device 12 in three dimensions. This causes a number of different forces to act on the movable element 26 so that it moves within/relative to the internal chamber 17. Specifically, when the entire housing 16 moves, the movable element 26 reacts to gravity and/or inertial forces. As such, the movable element 26 moves, relative to the internal chamber 17, in one (e.g., Figure C), two (e.g., FIGS. 3A and 3B), or three dimensions (e.g., FIG. 3D).

The embodiment shown in FIGS. 3A and 3B may permit movement of the movable element 26 in at least two dimensions—up and down and left and right (from the perspective of the Figures). Specifically, if the distance between the housing sidewalls 18 (of the internal chamber 17) is about equal to the outer dimension of the movable element 26, then the movable element 26 may be constrained to moving in the noted two dimensions. Other embodiments, however, may space the sidewalls 18 father apart, thus permitting the movable element 26 freedom of movement in three dimensions.

As shown, the movable element 26 contacts the piezoelectric charge conversion elements 24, thus generating energy that can be captured by external circuitry (e.g., a battery and/or other circuitry). In illustrative embodiments, the size of the movable element 26, and the pitch or spacing between the charge conversion elements 24, ensures that the movable element 26 can simultaneously contact at least two side-by-side charge conversion elements 24. Other embodiments may be spaced so that the movable element 26 only contacts one charge conversion element 24.

Free movement of the movable element 26 in two or three dimensions, however, can damage or degrade performance of the energy scavenger device 12. FIG. 3C schematically shows an embodiment that mitigates this risk, in which the housing 16 forms a secondary cylindrical wall 20A that limits movement of the movable element 26. Specifically, this secondary cylindrical wall 20A is coaxial and parallel with the other cylindrical wall 20 (the "main" cylindrical wall 20). The secondary cylindrical wall 20A, however, has a smaller diameter than that of the main cylindrical wall 20. Accordingly, this embodiment forms a toroidally shaped internal chamber 17 (also referred to as a "donut shaped" internal chamber 17). In contrast to the embodiments of FIGS. 3A and 3B, the embodiment of FIG. 3C permits the movable element 26 to move substantially only along the path formed by the internal and external cylindrical walls 20 and 20A. Specifically, the secondary cylindrical wall 20A is spaced at prescribed distance from the main cylindrical wall 20 to minimize movement normal to the two cylindrical walls 20 and 20A. In a similar manner, the sidewalls 18 also are spaced apart a prescribed distance to minimize movement generally normal to their surfaces. Accordingly, when the housing 16 moves certain ways, the movable element 26 is guided in a direction that is substantially parallel to the two cylindrical walls 20 and 20A. Those skilled in the art can select the appropriate distance between these two cylindrical walls 20 and 20A and the sidewalls 18.

It should be noted that the movable element 26 of FIG. 3C generally moves in two dimensions from the perspective of a Cartesian coordinate system. In this case, however, the movable element 26 is constrained to movement in a direction that is generally parallel to the cylindrical walls 20 and 20A—it can take a single path only. Accordingly, for purposes of various embodiments, such movement in a direction generally parallel to the cylindrical walls 20 and 20A is considered to be one dimensional movement. Freedom of movement (of the movable element 26) in a direction generally normal to the cylindrical walls 20 and 20A therefore is considered movement in a different dimension than that of FIG. 3C. In a corresponding manner, freedom of movement in a direction generally normal to the sidewalls 18 is considered movement in yet another dimension. Accordingly, the frame of reference of the movable element 26 in this embodiment is with respect to the walls of the internal chamber 17. Those skilled in the art can apply this reference system to other form factors having different wall configurations. In general, however, if the movable element 26 can move in any direction within the internal chamber 17, it is considered to have three dimensional freedom of movement.

To more efficiently capture the kinetic energy of the movable element 26, illustrative embodiments may position charge conversion elements 24 on walls other than the cylindrical wall(s) 20 and 20A. Specifically, the embodiments of FIGS. 3A and 3B have charge conversion elements 24 on the main cylindrical wall 20 only. FIG. 3C, however, positions charge conversion elements 24 on both the main and secondary cylindrical walls 20 and 20A, and on the sidewalls 18. In fact, the embodiments of FIGS. 3A and 3B also can position charge conversion elements 24 on the sidewalls 18. Again, although only one charge conversion element 24 is shown per wall, those skilled in the art can position rows of multiple charge conversion elements 24 on each wall.

FIG. 3D schematically shows another form factor, in which the housing 16 is in the form of an oval or sphere (only the housing 16 is shown in this figure). As such, the internal chamber 17 has a corresponding shape. This embodiment has a plurality of charge conversion elements 24 (not shown) that, like other embodiments, interact with the movable element 26 to capture kinetic energy generated by movement of the housing 16. This embodiment may be considered to permit three-dimensional movement of the movable element 26 because the movable element 26 has no constraints on its direction of movement within the internal chamber 17.

In some embodiments, the internal chamber 17 has more than one movable element 26. One benefit of having multiple movable elements 26 is the corresponding increase of the total mass of the movable elements 26 within the same housing 16. Specifically, the mass of movable element 26 is typically proportional to the harvestable kinetic energy (and thus converted electrical energy). Accordingly, to a certain degree, the device can generate more electrical energy with a higher movable member mass.

To that end, FIG. 4 schematically shows one such embodiment having three movable elements 26. Although all three movable elements 26 are identical in this embodiment, those skilled in the art can have movable elements that are different from each other. The number of movable elements 26 within the internal chamber 17, however, should be optimized so that they do not substantially inhibit free movement. In this and other embodiments, although the movable elements 26 may contact each other, each movable element 26 is substantially unconstrained by other movable elements 26. In other words, each movable element 26 is unconnected to any other movable element 26. For example, as here, the three movable elements 26 are in the form of three unconnected rolling elements.

The embodiments of FIGS. 3A-4 may not form complete cylinders (or complete other volumetric shapes, such as complete rectangles). For example, FIG. 5 schematically shows an arc-shaped energy scavenger device 12, in which the internal chamber 17 forms a partial toroid. Depending on the desired motion amplitude, the angle of the sector can be larger or smaller. In a manner similar to other embodiments, this embodiment can have charge conversion elements 24 on all internal walls potentially contacting the movable elements 26.

The movable element 26 can strike any of the charge conversion elements 24 with great force, consequently damaging both elements and the overall device. This even can happen to the embodiment shown in FIG. 3C. To further minimize and constrain motion of the movable element 26, the internal chamber 17 may form a guide, groove, or channel 30B that guides the movable element 26 in a more controlled manner. Such features preferably minimize the likelihood that the moving element 26 may damage itself or the charge conversion elements 24 within the internal chamber 17. Such embodiments thus improve device durability and robustness, consequently increasing the lifespan of the energy scavenger device 12.

Figure 6A:
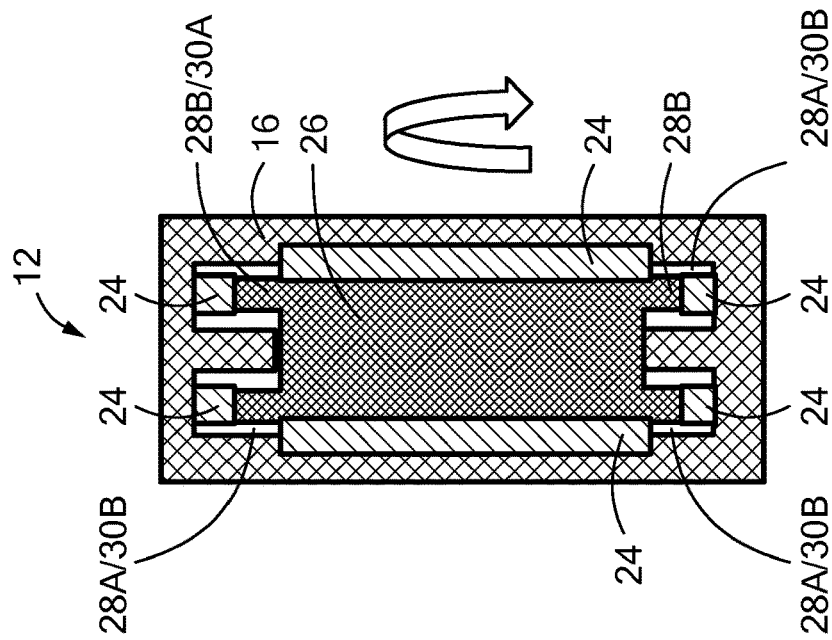
FIG. 6A schematically shows a simplified, cross-sectional view of an embodiment of the energy scavenger device of FIG. 2.
Figure 6B:
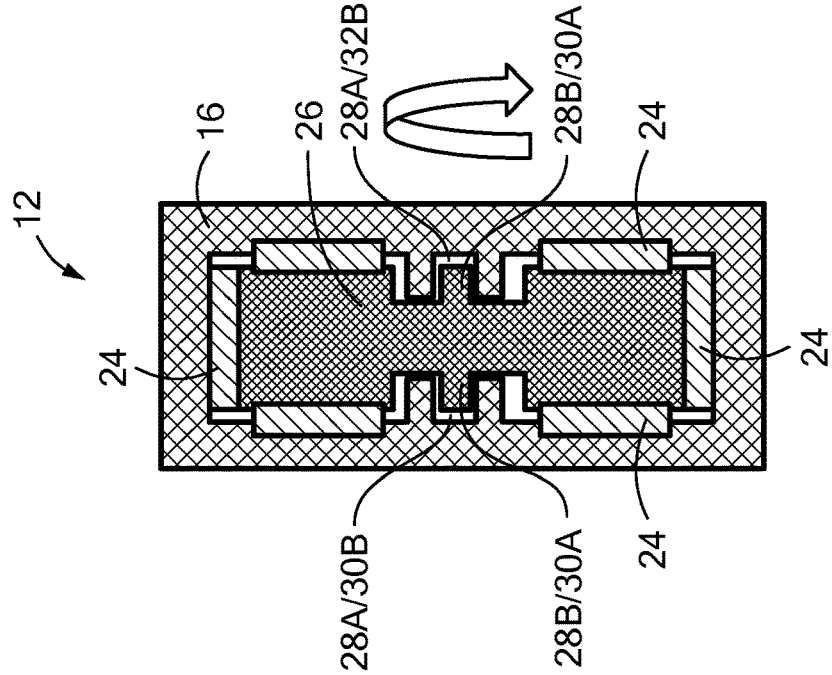
FIGS. 6B and 6C schematically show enlarged, partial cross-sectional views of the energy scavenger device of FIG. 6A in accordance with other embodiments of the invention.
Figure 6C:
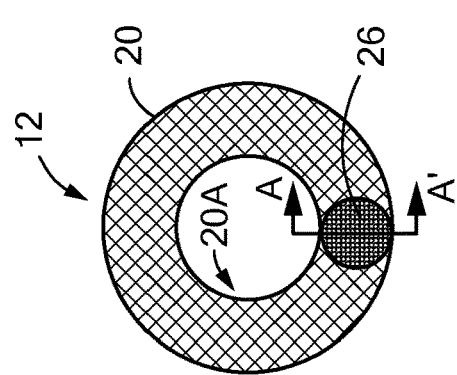

To that end, FIG. 6A schematically shows a high level cross-sectional view of the energy scavenger device 12, while FIGS. 6B and 6C schematically show cross-sections of the view of FIG. 6A across line A-A'. In a manner similar to the other embodiments, this embodiment also has charge conversion elements 24 along the internal walls, and the movable element 26 within the chamber 17. Both the internal walls and movable element have respective/complimentary surface features 28A and 28B that movably mate together/fit in registry within the internal chamber 17.

In the embodiment of FIG. 6B, for example, the movable element 26 has a central region with surface features 28B that form outwardly extending fingers 30A. These fingers 30A mate with and corresponding inwardly directed grooves/guides (hereinafter "grooves 30B") of the sidewalls 18. In a similar manner, the movable element 26 of the embodiment of FIG. 6C has longitudinally extending fingers 30A that mate with inwardly directed grooves 30B of the cylindrical wall 20.

In both cases, the grooves 30B act as a guide for directing the movable element 26 along the internal chamber 17 in a more controlled manner. In fact, the movable element 26 of FIGS. 6B and 6C also may rotate, further enhancing the energy capturing capability of the device. For example, the outwardly extending fingers 30A of FIG. 6B effectively form an axle about which the entire movable element 26 rotates when the housing 16 moves. Other embodiments, however, may fix the movable element 26 in place about its axle, only permitting rotational and/or sliding movement. To enhance rotation, such embodiments may asymmetrically weight their movable elements 26.

Figure 7A:
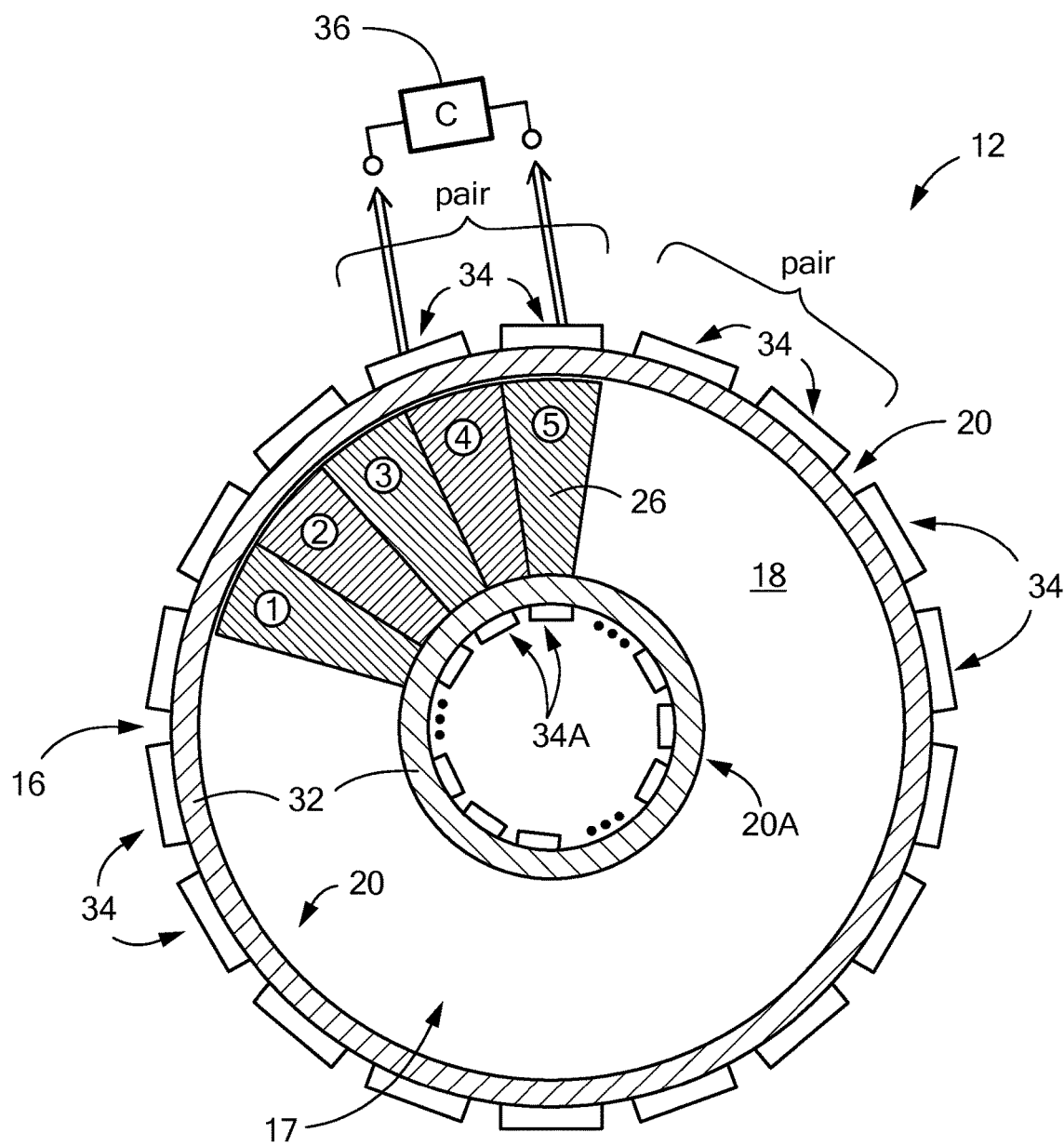
FIG. 7A schematically shows a partial cross-sectional view of the energy scavenger device of FIG. 2 and accordance with a first triboelectric embodiment.

As noted above, the energy scavenger device 12 uses one or both of piezoelectric elements and triboelectric elements. FIG. 7A schematically shows one embodiment that uses triboelectric elements, which take advantage of the triboelectric effect/phenomenon. Specifically, as known by those skilled in the art, the triboelectric effect is a type of contact electrification in which certain materials become non-negligibly electrically charged after they come into frictional contact with another, different material. For example, rubbing a balloon or plastic ruler against one's hair can build up tribo-electricity—static electricity. The polarity and strength of the charge produced differ depending upon the materials being used. Among other things, the materials surface roughness, temperature, strain, and other properties affect the charge transfer.

In fact, various materials are considered to form a so-called "triboelectric series," in which materials range from more positive to more negative. FIG. 7B shows a list of illustrative materials in the triboelectric series that may be used in accordance with illustrative embodiments of the invention. It should be noted that FIG. 7B was published in the publication "Transparent Triboelectric Nanogenerators and Self-Powered Pressure Sensors Based on Micropatterned Plastic Films, by Fan et al., published in Nalo Letters of the American Chemical Society in 2012 (no exact date known by inventors, 2012 is assumed based on material in the publication). That table only (i.e., not the rest of the publication), which is Figure S6 in the publication, is incorporated herein by reference. Most or all of such materials are non-metallic, electrically insulating materials. The arrow indicating "positive" indicates more positive materials in that direction, while the arrow indicating "negative" indicates more negative materials in that direction. This list therefore ranks various materials according to their properties of gaining (negative) or losing electrons (positive) in contact charging and frictional charging processes. The two highlighted materials thus are far enough away from each other so that they can be used as a friction interface to achieve high output power generation.

It should be noted that FIG. 7B is not an exhaustive list of all materials that can take advantage of the triboelectric effect. Illustrative embodiments thus can use of the materials that are not listed.

FIG. 7A therefore schematically shows a cross-sectional view of the energy scavenger device 12 of FIG. 2 and accordance with a first triboelectric embodiment. In a manner similar to the above discussed embodiments, this embodiment has the housing 16, which forms the internal chamber 17. Additionally, in a manner similar to the embodiment of FIG. 3C, this embodiment also has a movable element 26, and an internal cylindrical wall (a "secondary" cylindrical wall 20A) to limit motion of the movable element 26. It should be noted that this embodiment may omit the secondary cylindrical wall 20A.

Unlike prior embodiments, however, this embodiment has a stationary element 32 coupled to or otherwise flush against the cylindrical wall 20 (the "main cylindrical wall 20") of the internal chamber 17. Electrodes 34 (discussed below) couple with this wall 20. In fact, the housing 16 itself may form this stationary element 32. In the embodiment shown, the stationary element 32 extends a full 360 degrees about the internal chamber 17—it extends along the entire main cylindrical wall 20 without a break. Alternative embodiments may use a plurality of stationary elements 32 that are spaced apart, while others may position the stationary element(s) 32 about just a portion of the total circumference of the internal chamber 17.

To take advantage of the triboelectric effect, the stationary element 32 is formed from material that, in the triboelectric series, is spaced from the material included within the movable element 26. For example, the movable element 26 may be formed from polyester (PET), while the stationary element 32 may be formed from polydimethylsiloxane (PDMS).

In a manner similar to the piezoelectric embodiments described above, illustrative embodiments also may form the stationary element 32 on second or third internal walls within the internal chamber 17. For example, FIG. 7A also forms another stationary element 32 on another internal cylindrical wall 20A. This internal cylindrical wall 20A preferably is substantially parallel and coaxial with the main cylindrical wall 20 of the chamber 17, but has a smaller diameter than that of the main cylindrical wall 20. As with other noted embodiments, this other internal cylindrical wall 20A is referred to as the "secondary" cylindrical wall 20A and also has electrodes 34A (discussed below). To further enhance the triboelectric effect, some embodiments form third and/or fourth stationary elements 32 on the internal side of the sidewalls 18. Accordingly, the movable element 26 may interact with more than one stationary element 32 to more efficiently capture energy.

To take advantage of the triboelectric effect in this embodiment, the movable element 26 slides along the stationary element 32. In illustrative embodiments, the movable element 26 is a unitary structure formed by a plurality of segments. In the example of FIG. 7A, the movable element 26 is formed from five segments identified by numbers 1-5. Segments 1, 3, and 5 are formed from triboelectric material, while segments 2 and 4 are formed from passivation/insulative material. Each segment may have the same shape and size, or different shapes and sizes.

The outer face of each triboelectric segment 1, 3, and 5 preferably has a surface area, shape and size corresponding (e.g., the same) to that of the surface of the electrodes 34 facing inwardly. In a similar manner, the inner face of each triboelectric segment 1, 3, and 5 preferably has a surface area, shape, and size corresponding to (e.g., the same) that of the surface of the electrodes 34A facing outwardly. Other embodiments, however, may not have such a correspondence with one or both sets of the electrodes 34 and 34A.

Preferred embodiments also maximize the surface area of face of the movable element 26 sliding against the stationary element(s) 32. Accordingly, illustrative embodiments form the movable element 26 as an arc that has one or more slidable interface(s) with the stationary element(s) 32. For example, in the embodiment having stationary elements 32 on the sidewalls 18 and both cylindrical walls 20 and 20A, the arc-shaped movable element 26 has an outer surface that slidably contacts the stationary element 32 on the main cylindrical wall 20, a smaller inner surface that slidably contacts the stationary element 32 on the secondary cylindrical wall 20A, and front and back surfaces that respectively contact the stationary elements 32 on the interior sides of the front and back sidewalls 18.

To gather energy, the energy scavenger device 12 of FIG. 7A has the noted plurality of electrodes 34 and 34A respectively positioned about the outside of the main cylindrical wall 20 and inside of the secondary cylindrical wall 20A. More specifically, each electrode 34 and 34A is in direct contact with the housing 16. The plurality of electrodes 34 may be considered to form a plurality of pairs of electrodes 34. In a similar manner, the electrodes 34A on the secondary cylindrical wall 20A also may be considered to form a plurality of pairs of electrodes 34A.

As an example, FIG. 7A brackets two pairs of the electrodes 34 on the main cylindrical wall 20. Specifically, as shown in FIG. 7A, each pair of electrodes 34 is connected to circuitry 36 that uses or otherwise captures energy harvested by the energy scavenger device 12. In that case, each pair of electrodes 34 may form a potential difference used by the circuitry 36 to harvest the energy. For example, during use, one electrode 34 of a pair may have a positive potential while the other electrode 34 of that pair may have a negative potential. Either way, one electrode 34 may be more positive than the other, thus forming a potential difference.

Accordingly, during use, the housing 16 moves, causing the movable element 26 to slide over the stationary element 32. This movement causes the two elements 26 and 32 to interact, causing charge to transfer between two electrodes 34 and 34A. Specifically, the charges in two electrodes 34, and that in two electrodes 34A, changes as the moveable element 26 slides over the respective stationary elements 32.

Of course, those skilled in the art may use any of a wide variety of techniques to cause the two members to slide over one another. For example, the energy scavenger device 12 may be formed to have other form factors, such as a rectangular form factor or irregularly shaped form factor. As another example, the movable element 26 may be in the form of a rotor that rotates about an axis over the stationary element 32, which, in this latter example, acts as a stator.

Figure 8:
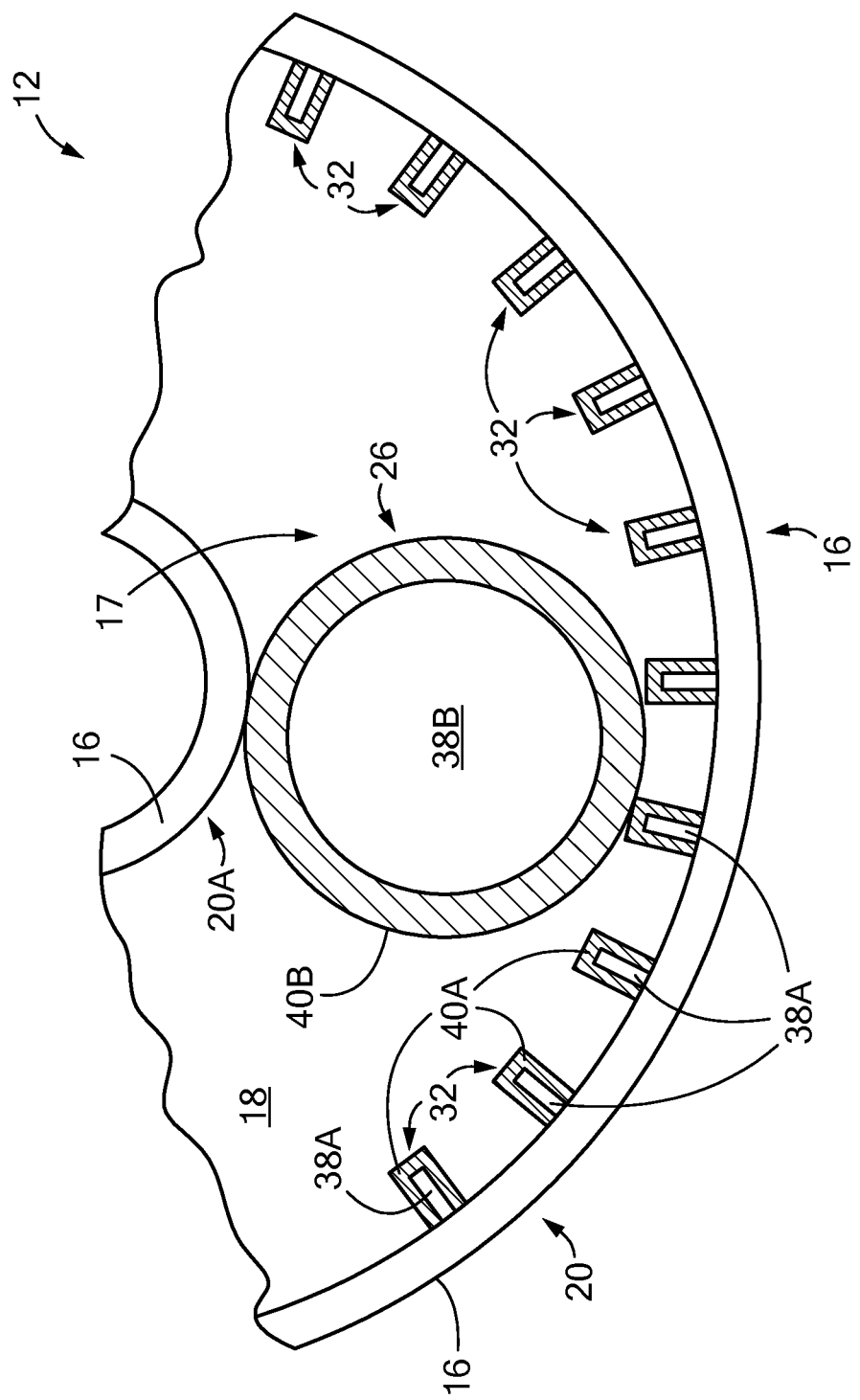
FIG. 8 schematically shows a partial cross-sectional view of the energy scavenger device of FIG. 2 and accordance with a second triboelectric embodiment.

Other embodiments may implement the triboelectric effect in another manner. For example, FIG. 8 schematically shows another triboelectric embodiment that uses the well-known vertical contact mode (also referred to as a "touch and separate" mode). More specifically, as known by those in the art, when two dissimilar materials on the triboelectric series are in contact, one acts as an electron donor, while the other acts as an electron accepter. When the materials are separated, induced net charges in each material produces a potential difference, which causes a current flow between electrodes 38A and 38B in contact with the two materials. Continuously repeating this process can produce an alternating current.

FIG. 8 schematically shows a portion of the internal chamber 17, where the stationary elements 32 are generically in the form of pillars. To some extent, this embodiment resembles the embodiments of FIGS. 3A-3C. In a manner similar to those embodiments, pillars are just one of a wide variety of different form factors of the stationary elements 32.

Specifically, this embodiment forms the stationary elements 32 from a conductive/metallic core 38A, such as aluminum or copper, at least partially covered with a covering 40A that, when in contact with another appropriate material, will react with a triboelectric effect (a "triboelectric material"). In a similar manner, the movable element 26 has a conductive/metallic core 38B, such as aluminum or copper, and is at least partially coated with a covering 40B including a second triboelectric material. As with other embodiments, the movable element 26 may be in the form of a rolling element, such as a cylinder or ball.

During use, the movable element 26 contacts the stationary elements 32. Since only a portion of the movable element 26 contacts the stationary element 32, both elements preferably are coated with the triboelectric coverings 40A and 40B primarily (or only) where they make contact. Moreover, during use, the movable element 26 contacts and moves past a given stationary element 32. Indeed, although there may be some negligible amount of sliding between the two members, this embodiment is not considered to have the movable and stationary elements 26 and 32 slide against each other. This is in direct contrast to the triboelectric embodiment of FIG. 7A. The triboelectric effect in this embodiment is generated primarily by the triboelectric coverings 40A and 40B contacting and then separating during use. Any incidental sliding thus has no more than a negligible impact on the triboelectric effect.

The metal core 38B of the movable element 26, and the metal core 38A of the stationary element 32, respectively function as one of the pairs of electrodes 34 of FIG. 7A. Specifically, the metal core 38B of the movable element 26 has a portion that is not coated with the triboelectric material. Accordingly, that uncoated portion of the metal core 38B is in direct electrical contact with metal of the housing 16 to connect with external circuitry 36 (not shown in FIG. 8). Among other ways, the movable element 26 may be formed with one or more protruding members/fingers 30A, similar to those of FIG. 6B or 6C, which slide along grooves 30B within the internal chamber 17. In that case, the grooves 30B in the internal chamber 17 have outwardly facing metal surfaces, making a metal-to-metal contact with the movable element 26. Other embodiments, however, may use other techniques for connecting with the core 38B of the movable element 26.

The metal core 38A of the stationary element 32 may extend through the housing 16 for more direct contact with an external circuit. Accordingly, the metal core 38B of the movable element 26 acts as one electrode 34 for each of the stationary elements 32 within the internal chamber 17. In other words, the core 38A of each stationary element 32 forms an electrode pair with the core 38B of the movable element 26.

Figure 9:
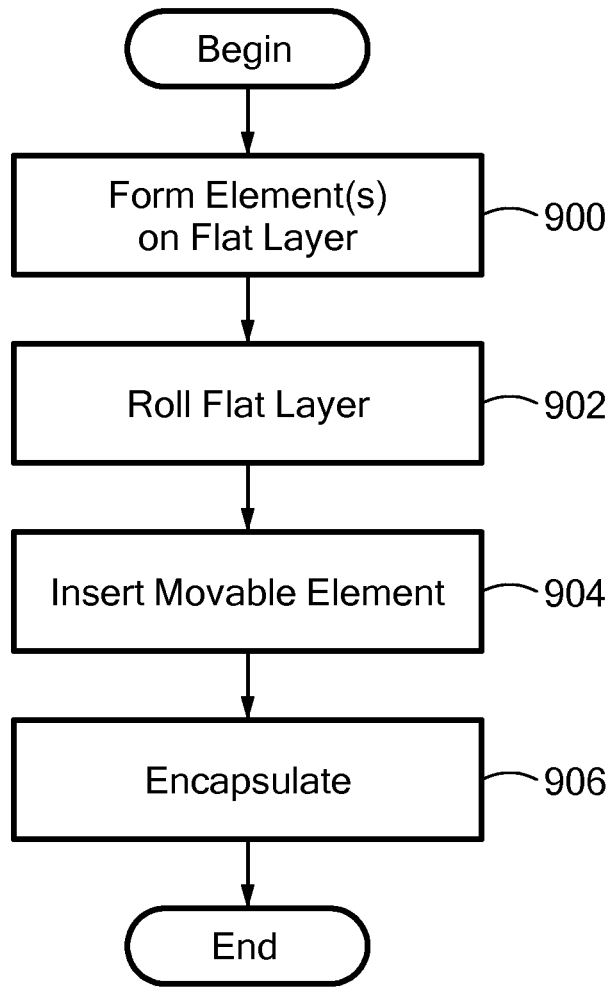
FIG. 9 generally shows a method of forming the energy scavenger device of FIG. 2 in accordance with illustrative embodiments the invention.

Those skilled in the art can form the energy scavenger device 12 at a wide variety of manners. To that end, FIG. 9 shows a process of forming the energy scavenger device 12 similar to that of FIG. 3A in accordance with some embodiments the invention. Those skilled in the art can apply principles of this process to techniques for forming the other embodiments.

It should be noted that this process is substantially simplified from a longer process that normally would be used to form the energy scavenger device 12. Accordingly, the process of forming the energy scavenger device 12 has many steps, such as testing steps, coupling and possibly deposition steps, which those skilled in the art likely would use. In addition, some of the steps may be performed in a different order than that shown, or at the same time. Those skilled in the art therefore can modify the process as appropriate. Moreover, as noted above and below, many of the materials and structures noted are but one of a wide variety of different materials and structures that may be used. Those skilled in the art can select the appropriate materials and structures depending upon the application and other constraints. Accordingly, discussion of specific materials and structures is not intended to limit all embodiments.

The process of FIG. 9 begins at step 900, which forms the charge conversion elements 24 on a flat layer of material 42. FIG. 10 schematically shows the device at this step of the process. As shown, the charge conversion elements 24 may be deposited or otherwise coupled to the housing 16 using a wide variety of techniques. The appropriate technique may be selected based upon the type of piezoelectric materials used. For example, the prior noted three layer piezoelectric stack may be formed by successive layer-by-layer deposition, or by securing the pre-formed stacks onto the flat layer material 42.

The flat layer of material 42 preferably is formed from a flexible material, such as plastic or other inert/insulative material. The side of the flat layer of material 42 that is opposite to the charge conversion elements 24 also has a metal routing layer 44 that electrically connects with the charge conversion elements 24. This metal 44 ultimately forms electrodes 34 for accessing the energy produced by the device.

Figure 11:
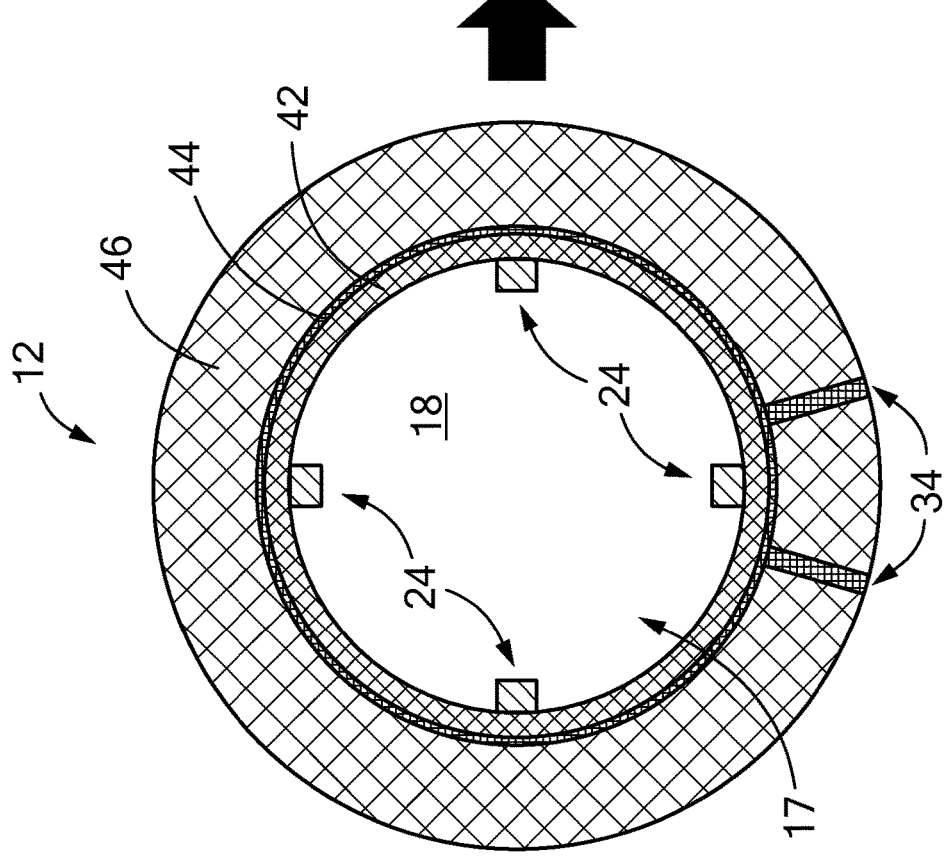
FIG. 11 schematically shows the energy scavenger device at step 902 of the process of FIG. 9.

The process continues to step 902, which rolls the flat layer of material 42 into a cylinder, and positions the rolled element into a supporting framework. For example, the supporting framework may include a mold for receiving molten plastic material. FIG. 11 schematically shows a cross-sectional view of the device at this point in the process. As shown, the metal 44 has formed a plurality of electrodes 34, although only two are shown. The two electrodes 34 that are shown in FIG. 11 couple with the charge conversion element 24 at the bottom of the drawing. For example, when the charge conversion elements 24 are implemented as a three layer stack (e.g., piezoelectric material/insulator/piezoelectric material), one of the electrodes 34 is electrically connected to the top layer, while the other electrode 34 is electrically connected to the bottom layer.

Figure 12:
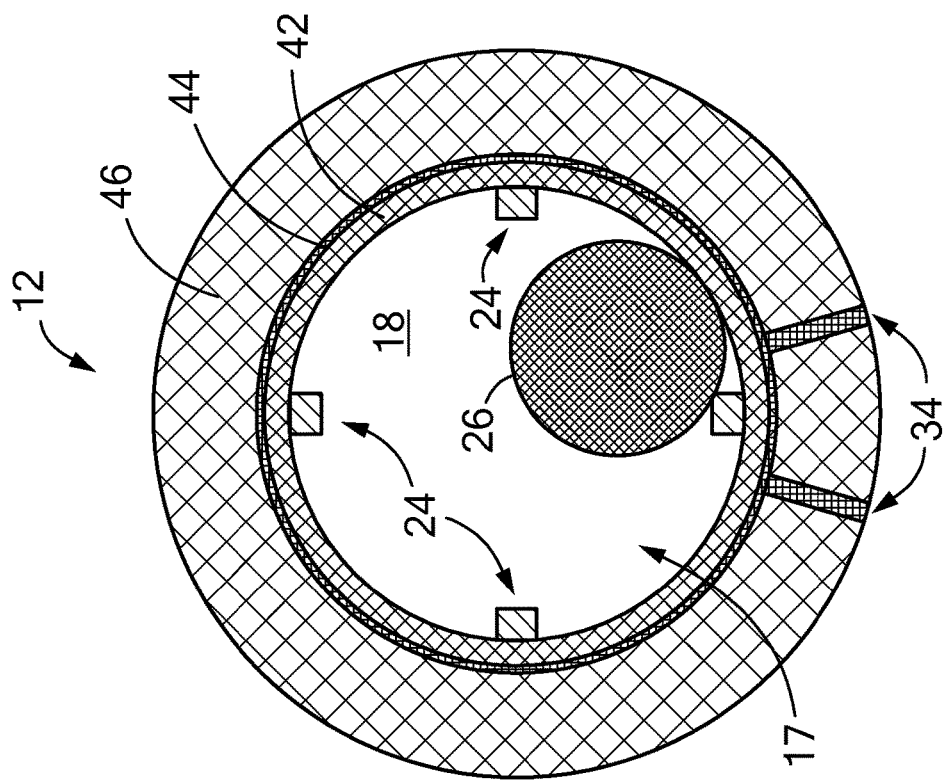
FIG. 12 schematically shows the energy scavenger device at steps 904 and 906 of the process of FIG. 9.

Next, the process adds the movable element 26 to the internal chamber 17 (step 904 FIG. 12), and then encapsulates the entire apparatus with injection molding material 46 or other material 46 (step 906). Indeed, intermediate steps are taken to ensure that the encapsulating material does not enter the internal chamber 17. For example, an intermediate step may form one or both of the sidewalls 18. Accordingly, the flexible layer effectively forms the housing 16. In some embodiments, the housing 16 also may be considered to include the flat layer of material 42, injection molding material 46, and the metal 44. Alternative embodiments may simply mechanically form the entire device without encapsulation step. In that case, the flat layer of material 42 may make up the majority of the housing 16.

Accordingly, illustrative embodiments make use of piezoelectric and/or triboelectric techniques to more efficiently capture low frequency, random kinetic energy from a person or an object.

Although the above discussion discloses various exemplary embodiments of the invention, it should be apparent that those skilled in the art can make various modifications that will achieve some of the advantages of the invention without departing from the true scope of the invention.

What is claimed is:

1. An electric energy scavenger device comprising:
a housing forming an internal chamber having an internal wall, the internal chamber having a guide feature;
a movable element contained within the internal chamber and configured to be guided by the guide feature in response to movement of the housing; and
a plurality of piezoelectric charge conversion elements within the internal chamber and positioned along the internal wall,
the plurality of piezoelectric charge conversion elements positioned side-by-side to contact the movable element when the movable element moves within the internal chamber, the movable element being configured to simultaneously contact at least two of the plurality of side-by-side piezoelectric charge conversion elements.

2. The electric energy scavenger device as defined by claim 1, wherein the housing forms a toroid, the internal chamber being in the shape of a toroid.

3. The electric energy scavenger device as defined by claim 1, wherein the internal wall comprises a first internal wall having first side-by-side piezoelectric charge conversion elements and a second internal wall having second side-by-side piezoelectric charge conversion elements, and the movable element is configured to simultaneously contact at least one of the first side-by-side piezoelectric charge conversion elements and at least one of the second side-by-side piezoelectric charge conversion elements.

4. The electric energy scavenger device as defined by claim 1, wherein the movable element has one or more surface features, and the internal chamber has one or more complimentarily shaped guide features configured to guide the movable element along the internal chamber.

5. The electric energy scavenger device as defined by claim 1, wherein the internal wall comprises a first internal wall, a second internal wall, and a third internal wall, the first and third walls being substantially parallel, the second internal wall being substantially normal to the first internal wall, the plurality piezoelectric of charge conversion elements comprising a first piezoelectric charge conversion element on the first internal wall, a second piezoelectric charge conversion element on the second internal wall, and a third piezoelectric charge conversion element on the third internal wall.

6. The electric energy scavenger device as defined by claim 3, wherein the internal chamber is configured so that the movable element is constrained to movement in a direction parallel to the first internal wall and the second internal wall.

7. The electric energy scavenger device as defined by claim 1, wherein the internal chamber is configured so that the movable element can move in two or three dimensions, relative to the internal chamber, in response to movement of the housing.

8. The electric energy scavenger device as defined by claim 1, wherein the housing is shaped as an arc.

9. An electric energy scavenger device comprising:
a housing forming an internal chamber having an internal wall, the internal chamber having a guide feature;
a movable element contained within the internal chamber and configured to be guided by the guide feature in response to movement of the housing; and
a plurality of piezoelectric charge conversion elements within the internal chamber and positioned along the internal wall,
wherein the movable element is configured to contact one or more of the plurality of piezoelectric charge conversion elements when the movable element moves within the internal chamber.

10. The electric energy scavenger device as defined by claim 9, wherein the movable element is configured to simultaneously contact at least two of the plurality of piezoelectric charge conversion elements that are positioned side-by-side along the internal wall.

11. The electric energy scavenger device as defined by claim 9, wherein the internal wall comprises a first internal wall with first side-by-side piezoelectric charge conversion elements positioned along the first internal wall and a second internal wall with second side-by-side piezoelectric charge conversion elements positioned along the second internal wall, and the movable element is configured to simultaneously contact at least one of the first side-by-side piezoelectric charge conversion elements and at least one of the second side-by-side piezoelectric charge conversion elements.

12. The electric energy scavenger device as defined by claim 9, wherein the movable element has one or more surface features, and the internal chamber has one or more complimentarily shaped guide features configured to guide the movable element along the internal chamber.

13. The electric energy scavenger device as defined by claim 9, wherein the internal wall comprises a first internal wall, a second internal wall, and a third internal wall, the first and third internal walls being substantially parallel, the second internal wall being substantially normal to the first internal wall, the plurality of piezoelectric charge conversion elements comprising a first piezoelectric charge conversion element on the first internal wall, a second piezoelectric charge conversion element on the second internal wall, and a third piezoelectric charge conversion element on the third internal wall.

14. The electric energy scavenger device as defined by claim 11, wherein the internal chamber is configured so that the movable element is constrained to movement in a direction parallel to the first internal wall and the second internal wall.

15. The electric energy scavenger device as defined by claim 9, wherein the internal chamber is configured so that the movable element can move in two or three dimensions, relative to the internal chamber, in response to movement of the housing.

16. An electric energy scavenger device comprising:
a housing forming an internal chamber having a first wall and a second wall;
a movable element contained within the internal chamber;
a first piezoelectric charge conversion element positioned along the first wall of the internal chamber; and
a second piezoelectric charge conversion element positioned along the second wall of the internal chamber,
wherein the movable element is configured to simultaneously contact the first and second piezoelectric charge conversion elements when the movable element moves within the internal chamber.

17. The electric energy scavenger device as defined by claim 16, wherein the internal chamber is configured so that the movable element is constrained to movement in a direction parallel to the first wall and the second wall.

18. The electric energy scavenger device as defined by claim 16, wherein the movable element has one or more surface features, and the internal chamber has complimentarily shaped surface guide features configured to guide the movable element along the internal chamber.

19. The electric energy scavenger device as defined by claim 18, wherein the one or more surface features comprises one or more outwardly extending fingers.

20. The electric energy scavenger device as defined by claim 19, wherein the one or more outwardly extending fingers form an axle about which the movable element rotates when the housing moves.

\* \* \* \* \*

UNITED STATES PATENT AND TRADEMARK OFFICE
CERTIFICATE OF CORRECTION

PATENT NO. : 10,069,441 B2
APPLICATION NO. : 14/918838
DATED : September 4, 2018
INVENTOR(S) : Yingqi Jiang et al.

It is certified that error appears in the above-identified patent and that said Letters Patent is hereby corrected as shown below:

In the Claims

In Claim 5, at Column 13, Line 65 delete "the plurality piezoelectric of charge conversion" and replace it with -- the plurality of piezoelectric charge conversion --.

Signed and Sealed this
Twenty-fifth Day of December, 2018

Andrei Iancu
*Director of the United States Patent and Trademark Office*